United States Patent
Reich

[15] 3,646,750
[45] Mar. 7, 1972

[54] ELECTRONIC CLOCKWORK DRIVE

[72] Inventor: Robert W. Reich, Merzhauserstr. 143, Freiburg im Breisgau, Germany

[22] Filed: Mar. 27, 1970

[21] Appl. No.: 23,263

[52] U.S. Cl. ................................. 58/28 A, 310/36, 318/127
[51] Int. Cl. ........................................ G04c 3/04, H02k 33/02
[58] Field of Search ......................... 58/28; 310/36; 318/127

[56] References Cited

UNITED STATES PATENTS

| | | | |
|---|---|---|---|
| 3,277,394 | 10/1966 | Holt et al. | 58/23 V |
| 3,524,118 | 8/1970 | Reich | 58/23 A |

Primary Examiner—Richard B. Wilkinson
Assistant Examiner—Edith C. Simmons
Attorney—Melvin A. Crosby

[57] ABSTRACT

The specification discloses an electronic clockwork drive in which an oscillator, which is oscillatable relative to a stationary coil, has two circumferentially spaced magnet systems, each comprising two circumferentially spaced respectively oppositely polarized magnetic axes and each having an airgap. As the oscillator oscillates, each magnet system induces actuating voltage pulses in the coil when the respective magnet system is substantially centered over the coil and moving in a respective direction. The voltage pulses induced in the coil actuate a coil energizing circuit to supply a pulse of current to the coil, which delivers a drive impulse to the oscillator. Each magnet system thus develops a single drive impulse on the oscillator during each period of oscillation of the oscillator.

15 Claims, 16 Drawing Figures

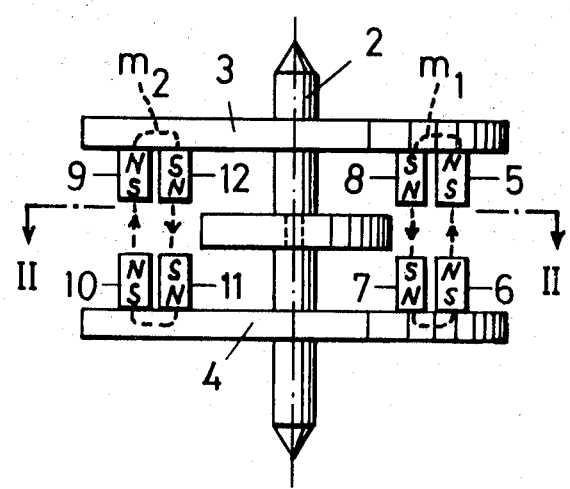
FIG. 1
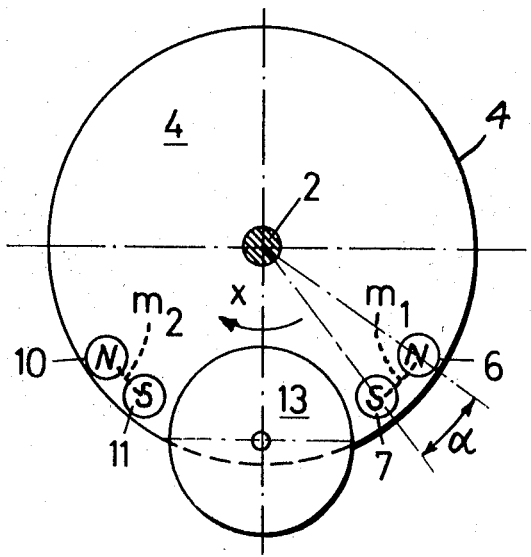
FIG. 2
FIG. 7
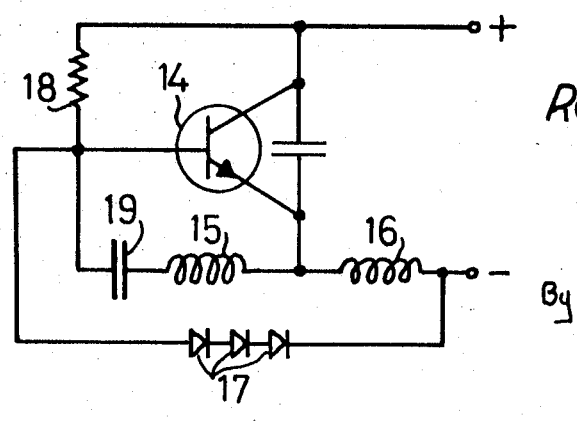
INVENTOR:
ROBERT WALTER REICH

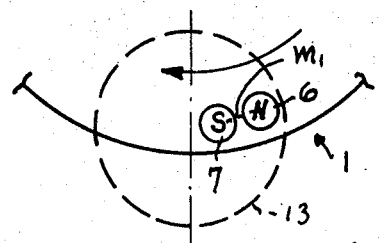 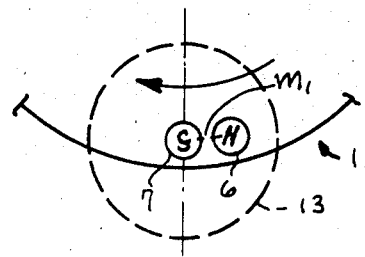
FIG. 3  FIG. 4
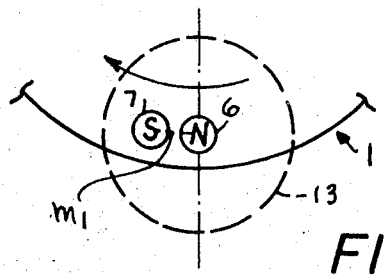 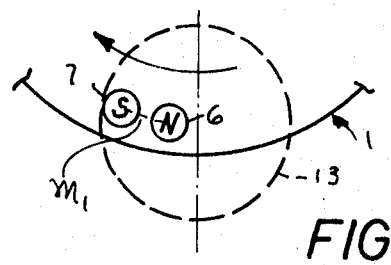
FIG. 5  FIG. 6
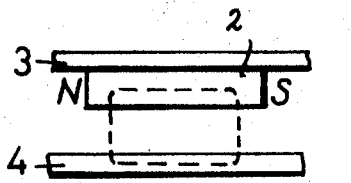
FIG. 8A
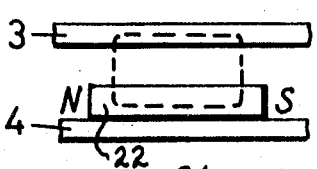
FIG. 8B
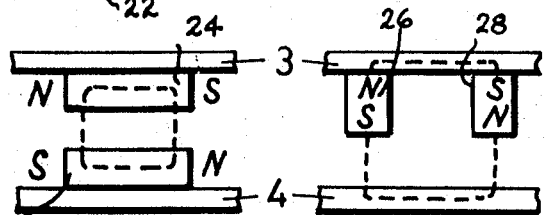
FIG. 9A  FIG. 9B
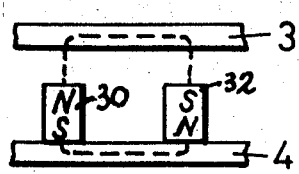
FIG. 9C
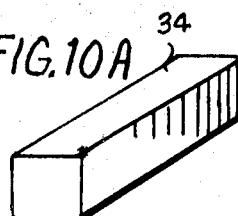 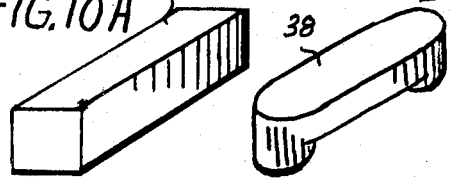
FIG. 10A  FIG. 10B
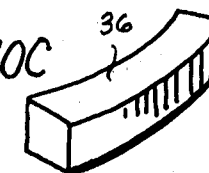 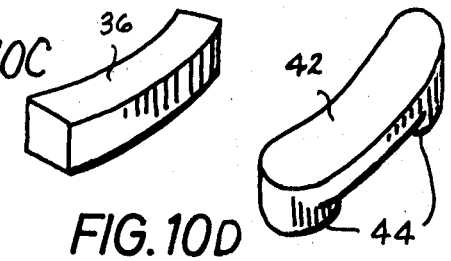
FIG. 10C
FIG. 10D
INVENTOR:
ROBERT WALTER REICH
By

ELECTRONIC CLOCKWORK DRIVE

The present invention relates to a drive arrangement for an electronic clock, or watch, employing an oscillator carrying magnet means and a coil arrangement past which the magnet means moves as the oscillator oscillates.

Electronic clocks and watches of the general nature referred to above were developed because electric clock works dependent upon the making and breaking of contacts were highly dependent upon voltage and the contacts thereof of accuracy desired and the present invention is directed to the fail and such clocks failed to maintain sufficient accuracy.

Electronic clocks, however, utilize no contacts and, therefore, have no contact failures and represent a substantial improvement over electric clocks employing contacts. However, contact free electronic clocks have not heretofore achieved the high degree to the problem of improving the accuracy of electronic clocks.

In most electronic clockworks the range of movement of the oscillator during which a driving impulse is delivered thereto is relatively broad and this can detract from the isochronous characteristics desired. In a known type electronic clock a driving impulse is provided extending over a relatively broad range of oscillator movement in one direction of oscillation thereof, while, in the other direction of oscillation, two driving impulses occur. Such an arrangement does not make it easy to develop isochronism because in such clocks the relay-time delay is five to 10 times as long as in contact clocks. Further, special properties of the elements employed in the electronic control circuits and, in particular, the transistors, develop influences that must be taken into account in the construction of a highly accurate electronic clockwork.

The present invention proposes an electronic clock drive in which the performance is improved by taking into account the prolonged operating time, namely, the greater relay-time delay of an electronic circuit, and which also takes into account special properties of the components to be found in electronic clock circuits.

With the foregoing in mind, a primary objective of the present invention is the provision of an electronic clockwork having improved operating characteristics.

A still further object of the present invention is the provision of an electronic clockwork in which the driving impulses exerted on the oscillator are accurately timed and occur in specific precise positions of the oscillator, thereby meeting the requirements of isochronism.

The foregoing objects, as well as still other objects and advantages of the present invention will become more apparent upon reference to the following detailed specification taken in connection with the accompanying drawings, in which:

FIG. 1 is a schematic side view of an oscillator and the coil arrangement for an electronic clock drive according to the present invention;

FIG. 2 is a plan sectional view indicated by line II—II on FIG. 1;

FIGS. 3 to 6 are schematic views showing the oscillator in different positions of oscillation relative to the coil arrangement of the clock drive;

FIG. 7 shows one example of an electronic circuit for connection with the coil arrangement of the drive including compensating elements;

FIGS. 8A, 8B, 9A, 9B and 9C show different ways of arranging magnets on the oscillator to form the magnetic systems; and FIGS. 10A, 10B, 10C, and 10D show different ways of forming the permanent magnets.

BRIEF SUMMARY OF THE INVENTION

According to the present invention the oscillator has two magnet systems spaced circumferentially thereof and each comprising two axial magnetic axes having airgaps therein and which airgaps sweep across a coil arrangement as the oscillator oscillates. In one position of the oscillator, all of the magnetic axes of both magnet systems lie outside the limits of the coil arrangement and the coil arrangement is adapted for being energized to deliver a driving impulse to the oscillator only when the magnetic axes of each system are substantially centered over the axis of the coil and moving in a respective direction, so that, in each direction of oscillation of the oscillator, a single driving impulse is delivered thereto in that position of the oscillator in which the respective magnetic axes of a respective one of the magnet systems are substantially centered over the coil arrangement.

A coil energizing circuit can be provided which is compensated for variations in voltage and temperature and which is also so arranged that, upon the initiation of a supply of energy thereto, the circuit momentarily energizes the coil arrangement to provide a starting impulse to set the oscillator into motion.

DETAILED DESCRIPTION OF THE INVENTION

Referring to the drawings somewhat more in detail, the oscillator generally indicated by reference numeral 1 in FIGS. 1 and 2, comprises a shaft 2 and two support members in the form of axially spaced discs 3 and 4 fixed thereto. The oscillator structure is biased by a spring (which is not shown) toward a predetermined mechanical null position in the conventional manner. The discs 3 and 4, as mentioned, form support elements and need not be in the form of discs, but can be in the form of arms, or wings, or sectors, or any other suitable configuration. The purpose of discs 3 and 4 is to support the permanent magnets forming the two magnet systems and, functionally, can be considered to be merely support members although, advantageously, the members are so arranged that the oscillator is mechanically balanced about the axis of shaft 2.

The discs 3 and 4, as will be seen, may be made of nonmagnetic material, such as brass, or plastic, material, or in certain cases, it is preferable for the discs to consist of a ferromagnetic material, such as iron, or steel.

In the arrangement of FIGS. 1 and 2, the discs, or support members, 3 and 4 carry permanent magnets 5, 6, 7 and 8 making up a first magnet system, indicated at $m_1$ and the magnets 9, 10, 11 and 12 making up a second magnet system, indicated at $m_2$.

The two magnet systems $m_1$ and $m_2$ are disposed a certain radial distance from the axis of shaft 2 and are circumferentially spaced from each other on opposite sides of a certain radius of the oscillator. The magnets 5 and 6 pertaining to magnet system $m_1$ are poled in the same axial direction and define one magnetic axis, while the magnets 7 and 8 of system $m_1$ are disposed adjacent to magnets 5, 6 and are poled in the opposite axial direction and define another magnetic axis of the magnet system $m_1$. The return paths between the magnets 5 and 8 and between the magnets 6 and 7 are through the discs 3 and 4 at the ends of the magnets adjacent said discs and for this purpose the discs 3 and 4 are made of ferromagnetic material, at least in the region of the ends of the said magnets.

The remainder of the paths of magnet system $m_1$ consists of the axially directed portions of the paths which define the airgaps extending between magnets 5 and 6 on the one hand and between magnets 7 and 8 on the other hand.

The magnet system indicated at $m_2$ is made up in the same manner and it will be noted that the magnetic axis defined by magnets 11 and 12 of magnet system $m_2$ is poled in the same direction as the magnetic axis made up of the magnets 7 and 8 of magnet system $m_1$, while the magnetic axis of magnet system $m_2$ made up of magnets 9 and 10 is poled in the opposite direction and in the same direction as the magnetic axis made up of the magnets 5 and 6 of magnet system $m_1$.

Disposed in the plane of the airgaps between the magnets of the magnet systems $m_1$ and $m_2$ is the coil arrangement 13. It will be apparent that, as the oscillator oscillates the magnetic axes of the two magnet systems will sweep across coil 13 substantially in the radial direction thereof from one side to the other of the coil arrangement.

As it will be seen in FIGS. 1 and 2, the circumferential spacing between the magnetic axes of each magnet system is relatively small and is substantially smaller than the length of the radius of coil arrangement 13.

In FIG. 2, the angular spacing between the magnetic axes of magnet system $m_1$ is indicated by the angle $\alpha$. As will be seen in FIG. 2, the magnetic axes of the magnetic systems $m_1$ and $m_2$ are the same radial distance from the axis of oscillation of the oscillator as the center of coil arrangement 13.

Coil arrangement 13 may be in the form of a single coil. However, the coil arrangement 13 can consist of two coil portions, with one portion for the development of excitation pulses and the other portion for the development of drive pulses in accordance with well-known conventional practices.

Turning now to FIGS. 3 to 6, the oscillator is shown oscillating in a clockwise direction, with the magnetic axes of magnet system $m_1$ swinging over the coil arrangement 13. The coil arrangement is so connected in its energizing circuit that movement of the magnetic axis marked S in FIGS. 3 to 6 in a direction from the outside of the coil toward the inside will develop a voltage pulse in the coil arrangement opposite in polarity to that required to actuate the circuit. The movement of the magnetic axis marked N in FIGS. 3 to 6 in the same direction will induce a voltage pulse in circuit actuating direction in opposition to the voltage pulse developed by magnetic axis S. Thus, while the magnetic axes are in the position of FIG. 3 and swinging toward the center of the coil arrangement, the two voltage pulses induced by the magnetic axes S and N will balance each other out, and the energizing circuit will not be actuated.

In FIG. 4, the magnetic axis marked S has reached the center of the coil arrangement and induces no voltage therein, while the magnetic axis marked N is inducing a voltage pulse in the coil arrangement of a polarity to actuate the energizing circuit.

In FIG. 5, the magnetic axis marked S has crossed the center of the coil and is inducing a voltage pulse in the coil arrangement of a polarity to actuate the energizing circuit, while the magnetic axis marked N is at the center of the coil arrangement an is inducing no voltage therein.

In FIG. 6, both magnetic axes have passed the center of the coil arrangement and the voltage pulses induced in the coil arrangement of the magnetic axes are again being cancelled out.

It will be apparent that a strong actuating pulse will be delivered to the coil energizing circuit only when the two magnetic axes are passing across the center of the coil arrangement. In the position of FIG. 4, one magnetic axis is supplying a pulse in the direction to actuate the energizing circuit and the same condition exists in FIG. 5 and during the interval between FIGS. 4 and 5 both of the magnetic axes are contributing to the actuating voltage pulse supplied to the energizing circuit. The pulse of current to the coil arrangement thus occurs at a certain precise position of the oscillator and the magnetic pulse from the coil arrangement acts to propel the magnetic axis marked S and to attract the magnetic axis marked N and this adds up to a strong driving impulse exerted on the oscillator in the direction of oscillation thereof.

In the opposite direction of movement of the oscillator when the magnetic axes N and S of magnet system $m_1$ move in a counterclockwise direction through the coil arrangement no driving pulse will be developed thereby. However, the magnetic axes of the coil system $m_2$ will, in the same manner as described above, develop a strong driving impulse on the oscillator when the magnetic axes thereof are centered with respect to the axis of the coil arrangement.

It will be evident then by spacing the magnetic axes of the magnet systems rather closely together, the amount of movement of the oscillator during which driving impulses are delivered thereto can be made quite small. The precision with which the driving impulses are delivered to the oscillator results in an isochronous arrangement superior to that obtained by other known electronic clockwork driving arrangements.

One type of energizing circuit that can be employed for energizing the drive coil is shown in FIG. 7. In FIG. 7, the terminals marked plus and minus are adapted for being connected across a direct current source of voltage. The terminal marked plus is connected to the collector of the NPN-transistor 14, while the emitter thereof is connected to a point between exciter coil 15 and driving coil 16 with the opposite end of driving coil 16 being connected to the minus terminal. The base of transistor 14 is connected through resistor 18 with the plus terminal and through capacitor 19 to one end of exciter coil 15, the other end of which, as mentioned, is connected to the emitter of transistor 14. Further, the base of transistor 14 is connected through the serially connected diodes 17 with the aforementioned minus terminal. The diodes 17, which are included in the circuit to provide for temperature and/or voltage compensation, may be replaced by a transistor, if so desired. A further capacitor is connected between the emitter and collector of transistor 14.

The circuit arrangement described is such that upon initiation of a supply of direct voltage to the terminals and poled in the direction indicated by the plus and minus signs on the terminals, the transistor will be momentarily saturated and can deliver a driving impulse to the oscillator to set it into motion. The circuit arrangement in FIG. 7 thus forms a self-starting circuit. The circuit can be started by initiating the voltage supply across the terminals, or a switch can be connected between the voltage source of one of the terminals and upon opening and then closing thereof the oscillator will be set into motion.

The arrangement of FIGS. 1 and 2 utilizes four magnets in each magnet system but other arrangements of the permanent magnets are quite possible as is illustrated in FIGS. 8A, 8B, 9A, 9B and 9C.

In FIG. 8A a single barlike magnet 20 is shown attached to the side of disc 3 which faces disc 4. In this case, at least disc 4 is made of ferromagnetic material and provides the return path so that between disc 4 and the opposite ends of the magnet carried by disc 3 there is established the magnetic axes of the respective magnet system and with the airgaps therein.

In FIG. 8B, an arrangement is shown wherein a permanent magnet 22 is mounted on the side of disc 4 which faces 3 and in this case disc 3 is formed of ferromagnetic material.

In FIG. 9A, barlike permanent magnets 24 and 26 are mounted on the sides of discs 3 and 4 which face each other and so as to extend substantially circumferentially of the oscillator, and the magnets are poled in respectively opposite circumferential directions so that the discs 3 and 4 can be made of nonmagnetic material and the magnets themselves form the return paths extending from one magnetic axis to the other.

In FIG. 9B, two short magnets 26 and 28 are mounted on the side of disc 3 which faces disc 4 and these magnets are poled in respectively opposite axial directions of the oscillator and both of the discs 3 and 4 are formed of ferromagnetic material.

In FIG. 9C, the same arrangement as that of FIG. 9B is shown except that the magnets 30 and 32 are mounted on the side of disc 4 facing disc 3.

As it will be seen in FIG. 10A, the permanent magnet 34 can be a straight barlike element, or it can be curved as shown at 36 in FIG. 10C. Further, the magnet can be straight as shown at 38 in FIG. 10B and with elevated regions 40 at the ends defining the pole faces. Also, as shown in FIG. 10D, a magnet 42 having raised end parts 44 forming pole faces thereon can be curved similarly to the magnet shown in FIG. 10C. The curvature of the magnets of 10C and 10D are preferably such that the center of the curvature thereof lies on the axis of oscillation of the oscillator.

The permanent magnets can be attached to the supporting parts of the oscillator as by soldering or adhesive, or by riveting or the like, or in any other suitable manner which results in a permanent connection of the permanent magnets to the supporting parts of the oscillator.

It will be understood that modifications can be made within the scope of the appended claims.

What is claimed is:

1. Electronic clockwork drive: oscillator means oscillatable about a predetermined axis, magnet means carried by said oscillator means and forming a pair of magnet systems spaced equal radial distances from said axis and spaced circumferentially from each other on opposite directions from a certain radius of said oscillator means, each magnet system comprising circumferentially spaced magnetic axes parallel to the said predetermined axis and including coplanar airgaps, the axes of said magnet systems nearest said radius being poled in one and the same direction and the other of said axes being poled in the opposite direction, stationary coil means having an axis parallel to said predetermined axis and disposed in the path of said magnetic axes in the plane of said airgaps whereby said airgaps sweep through said coil means as the oscillator means oscillates, the dimension of said coil means in the circumferential direction of said oscillator means being such that in one position of said oscillator means all of said magnetic axes lie outside the circumferential limits of said coil means, said coil means being adapted for connection in a coil energizing circuit which is adapted for actuation by voltages induced therein by the magnetic axes of each said magnet system as the magnet system passes across the coil axis in a respective direction, said coil means when energized supplying a driving pulse to the respective magnet system in the direction of oscillation of said oscillator means.

2. An electronic clockwork drive according to claim 1, in which the magnetic axes of said magnet systems are so poled that during movement of a said magnet system in the said respective direction thereof the leading one of the magnetic axes thereof develops circuit actuating voltage in said coil means while moving away from the axis of said coil means while the trailing one of said magnetic axes develops circuit actuating voltage in said coil means while approaching the axis of said coil means.

3. An electronic clockwork drive according to claim 2, in which the circumferential spacing between the magnetic axes of each said magnet system is substantially smaller than the radius of said coil means.

4. An electronic clockwork drive according to claim 1, in which each said magnet system comprises a single elongated permanent magnet extending substantially circumferentially of said oscillator means and having poles at the opposite ends, said oscillator means comprising a first part on one axial side of said coil means supporting said magnets and a second part on the axial side of said coil means spaced axially from and fixed to said first part, said second part comprising magnetic means arranged in axially spaced opposition to said magnets and forming therewith said magnet systems including said coplanar airgaps.

5. An electronic clockwork drive according to claim 1, in which said oscillator means comprises axially spaced fixedly interconnected parts on opposite axial sides of said coil means and each magnet system comprises a pair of elongated permanent magnets having poles at the ends thereof and extending substantially circumferentially of said oscillator means, the magnets of each pair being poled in respectively opposite directions, each magnet being mounted on the side of the respective part of the oscillator means which faces the other part thereof, said magnetic axes of each magnet system and said airgaps being formed between the opposed ends of each said pair of permanent magnets.

6. An electronic clockwork drive according to claim 4, in which each permanent magnet is a straight barlike member.

7. An electronic clockwork drive according to claim 6, in which each permanent magnet has elevated pole regions at the ends projecting toward the other permanent magnet of the respective pair.

8. An electronic clockwork drive according to claim 4, in which each permanent magnet is curved in the longitudinal direction along a circular arc having a center substantially on said predetermined axis.

9. An electronic clockwork drive according to claim 8, in which each permanent magnet has elevated pole regions at the ends projecting toward the other permanent magnet of the respective pair.

10. An electronic clockwork drive according to claim 1, in which said oscillator means comprises two axially spaced fixedly interconnected parts, each magnet system comprising a pair of permanent magnets mounted on the side of one of said parts which faces the other part and also mounted on the magnetic axes of the respective magnet systems, each said magnet having a pole facing each said part, the magnets of each pair thereof being poled in respectively opposite directions, at least said other part being formed of magnetic material.

11. An electronic clockwork drive according to claim 1, in which said oscillator means comprises two axially spaced fixedly interconnected parts, each magnet system comprising four permanent magnets with two magnets disposed on each of said magnetic axes, said oscillator means comprising two axially spaced fixedly interconnected parts and two magnets of each magnet system being mounted on the side of each said part which faces the other said part, each magnet having a pole facing each said part, the two magnets of each magnet system mounted on a respective part being poled in respectively opposite directions and the two magnets of each magnet system mounted on the same magnetic axis being poled in the same axial direction.

12. An electronic clockwork drive according to claim 1, in which said coil means comprises an exciter coil and a driving coil.

13. An electronic clockwork drive according to claim 1, in which said coil means comprises a single coil.

14. An electronic clockwork drive according to claim 1, which includes coil energizing circuit means connected to said coil means, said circuit means comprising means for stabilizing the operation thereof with respect to at least one of temperature and voltage.

15. An electronic clockwork drive according to claim 1, which includes coil energizing circuit means connected to said coil means and means for causing said oscillator to commence oscillating upon the initiation of a supply of energy to said circuit means.

* * * * *